(12) United States Patent
Yoshida

(10) Patent No.: US 12,550,657 B2
(45) Date of Patent: Feb. 10, 2026

(54) FLUID CONTROL DEVICE AND SUBSTRATE PROCESSING APPARATUS

(71) Applicant: Tokyo Electron Limited, Tokyo (JP)

(72) Inventor: Takashi Yoshida, Oshu (JP)

(73) Assignee: Tokyo Electron Limited, Tokyo (JP)

( * ) Notice: Subject to any disclaimer, the term of this patent is extended or adjusted under 35 U.S.C. 154(b) by 8 days.

(21) Appl. No.: 18/615,271

(22) Filed: Mar. 25, 2024

(65) Prior Publication Data

US 2024/0328522 A1     Oct. 3, 2024

(30) Foreign Application Priority Data

Mar. 31, 2023     (JP) .................. 2023-058918

(51) Int. Cl.
| | |
|---|---|
| *H01L 21/67* | (2006.01) |
| *C23C 16/448* | (2006.01) |
| *F16K 11/20* | (2006.01) |
| *F16K 27/00* | (2006.01) |
| *F16K 37/00* | (2006.01) |

(52) U.S. Cl.
CPC .... *H01L 21/67017* (2013.01); *C23C 16/4482* (2013.01); *F16K 11/20* (2013.01); *F16K 27/003* (2013.01); *F16K 37/005* (2013.01); *H01L 21/67063* (2013.01); *H01L 21/67069* (2013.01); *H01L 21/67075* (2013.01)

(58) Field of Classification Search
CPC ...... F16K 27/003; F16K 11/20; F16K 37/005; C23C 16/4482; H01L 21/67017; H01L 21/67063; H01L 21/67069; H01L 21/67075; H01L 21/6708; H01L 21/67086
See application file for complete search history.

(56) References Cited

U.S. PATENT DOCUMENTS

| | | | | |
|---|---|---|---|---|
| 5,771,919 | A | * | 6/1998 | Itoi ...................... F16K 27/003 |
| | | | | 285/137.11 |
| 2007/0295405 | A1 | * | 12/2007 | Okabe ................. F16K 27/003 |
| | | | | 137/240 |
| 2023/0374657 | A1 | * | 11/2023 | Bamford ........... H01J 37/32458 |
| 2024/0316581 | A1 | * | 9/2024 | Lee ........................ C23C 16/44 |

FOREIGN PATENT DOCUMENTS

JP            H07-119844 A     5/1995

* cited by examiner

*Primary Examiner* — Atif H Chaudry
(74) *Attorney, Agent, or Firm* — Armstrong Teasdale LLP

(57) ABSTRACT

A fluid control device that controls a fluid supplied into a process container includes: a flow path block; and a fluid controller installed to the flow path block. The flow path block includes: a gas supply flow path including an inlet, through which the fluid is introduced, and an outlet through which the fluid flows into the process container; and a storage chamber that stores the fluid in the gas supply flow path between the inlet and the outlet. The fluid controller includes: a first valve that opens and closes the gas supply flow path between the inlet and the storage chamber; and a second valve that opens and closes the gas supply flow path between the storage chamber and the outlet.

8 Claims, 4 Drawing Sheets

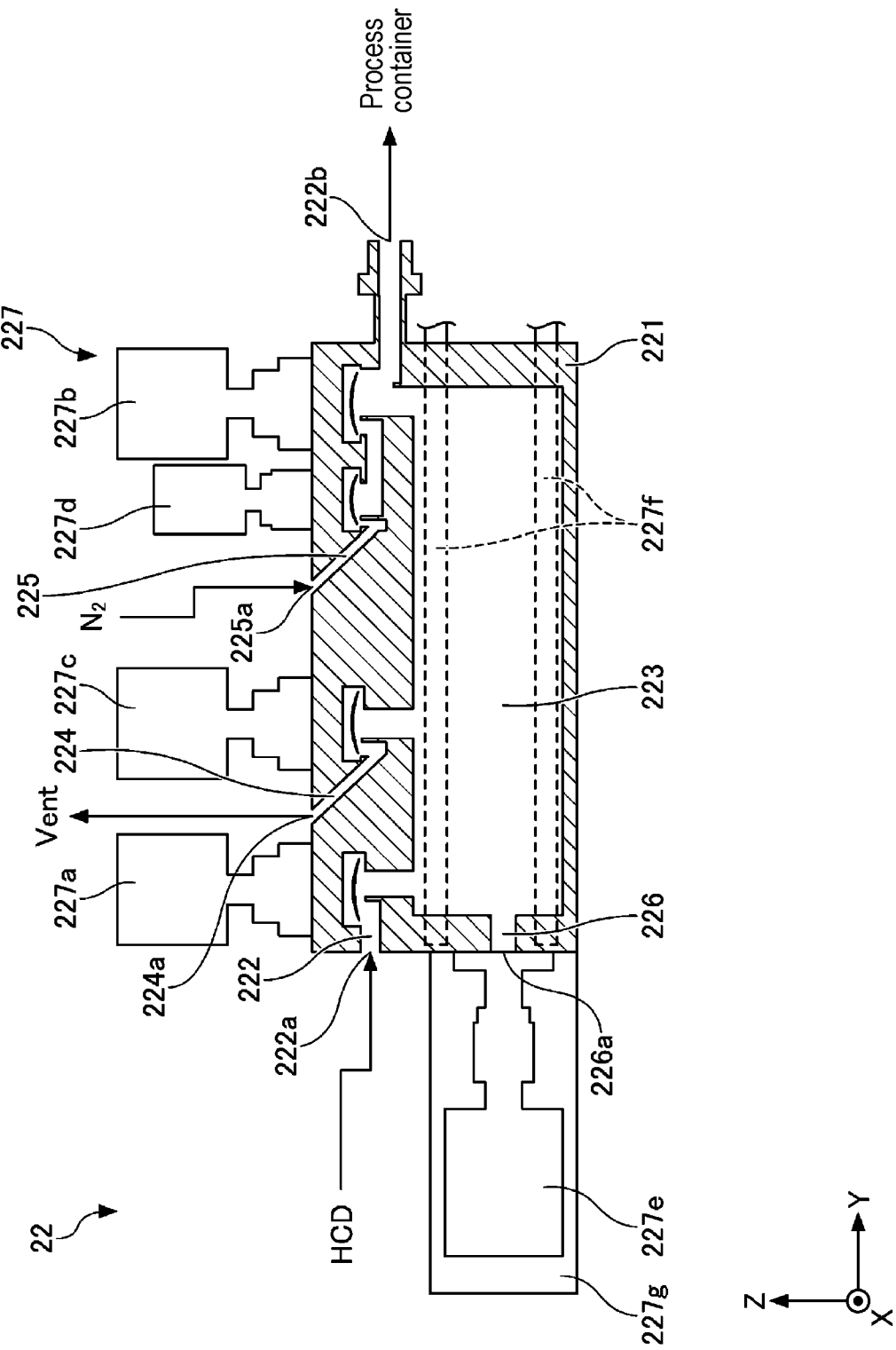

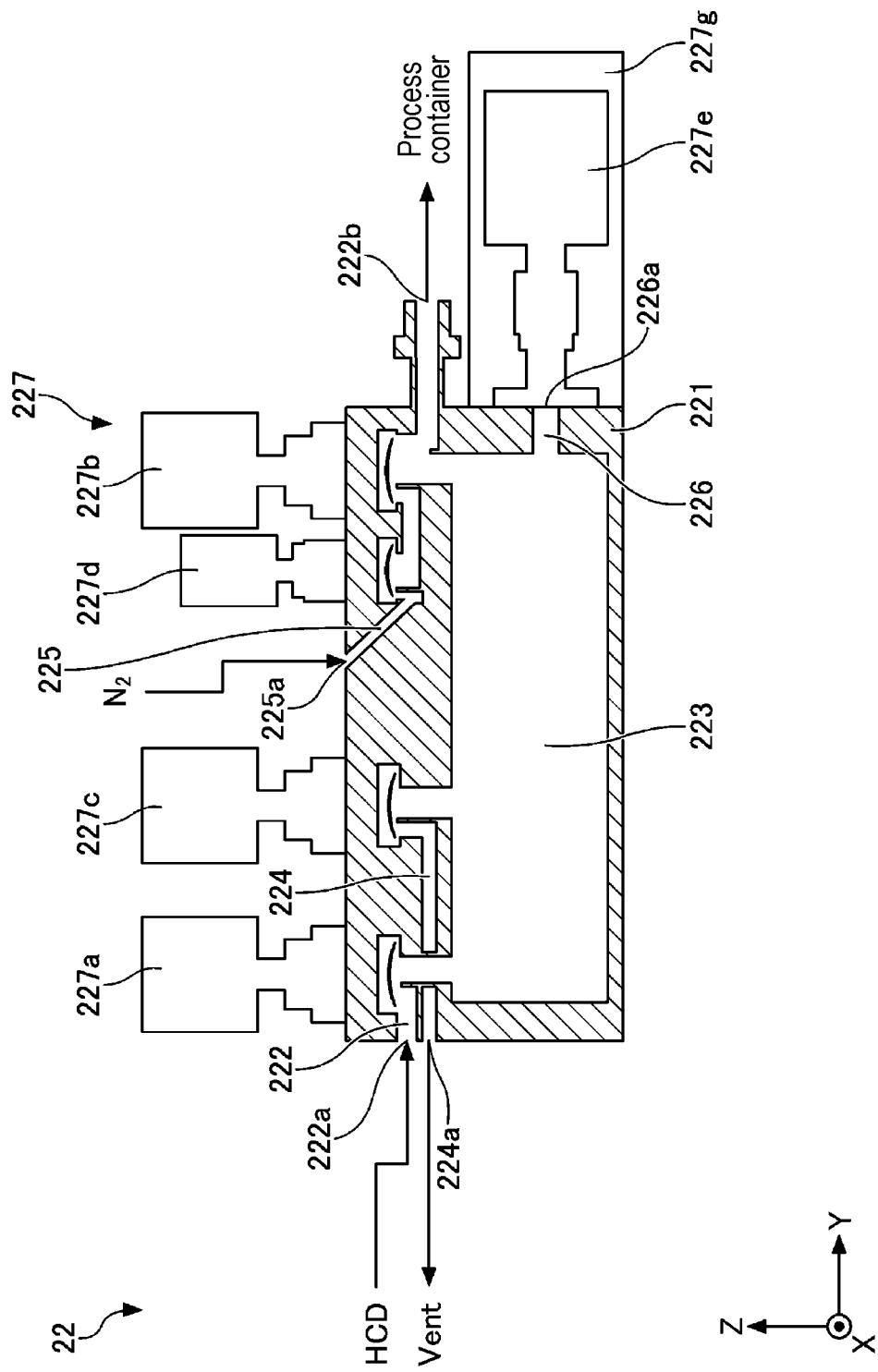

FLUID CONTROL DEVICE AND SUBSTRATE PROCESSING APPARATUS

CROSS-REFERENCE TO RELATED APPLICATION

This application is based upon and claims the benefit of priority from Japanese Patent Application No. 2023-058918, filed on Mar. 31, 2023, the entire contents of which are incorporated herein by reference.

TECHNICAL FIELD

The present disclosure relates to a fluid control device and a substrate processing apparatus.

BACKGROUND

A block valve with a tank chamber is known, which has a gas supply flow path, through which a gas supplied from a gas source flows to a process chamber, and a branch passage, which is branched from the gas supply flow path and is connected to a vacuum pump, the tank chamber being provided in the middle of the branch passage (see, e.g., Patent Document 1).

PRIOR ART DOCUMENTS

Patent Documents

Patent Document 1: Japanese Laid-Open Publication No. H07-119844

SUMMARY

According to one embodiment of the present disclosure, a fluid control device that controls a fluid supplied into a process container includes: a flow path block; and a fluid controller installed to the flow path block. The flow path block includes: a gas supply flow path including an inlet, through which the fluid is introduced, and an outlet through which the fluid flows into the process container; and a storage chamber that stores the fluid in the gas supply flow path between the inlet and the outlet. The fluid controller includes: a first valve that opens and closes the gas supply flow path between the inlet and the storage chamber; and a second valve that opens and closes the gas supply flow path between the storage chamber and the outlet.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 3 is a cross-sectional view illustrating a fluid control device according to a first modification of the embodiment.

FIG. 4 is a cross-sectional view illustrating a fluid control device according to a second modification of the embodiment.

DETAILED DESCRIPTION

Figure 1:
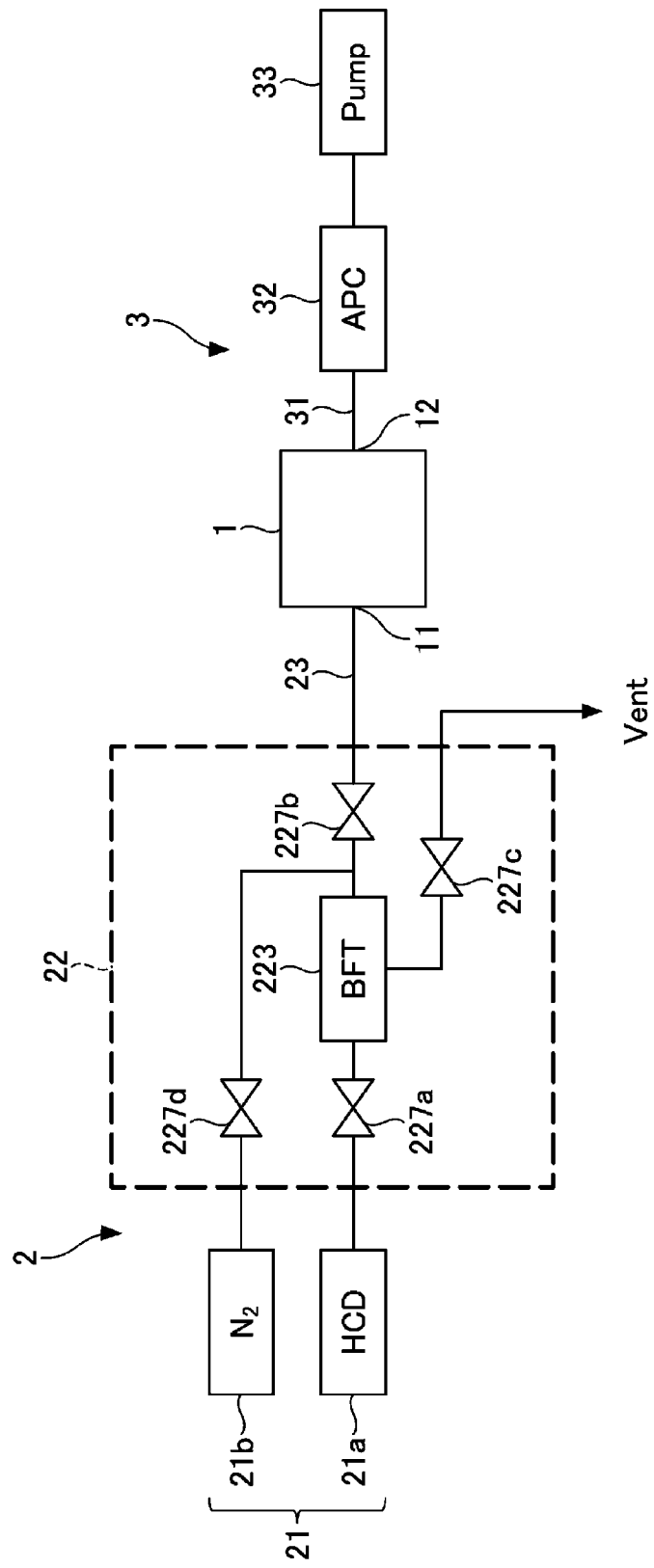
FIG. 1 is a diagram illustrating a substrate processing apparatus according to an embodiment.
Figure 2:
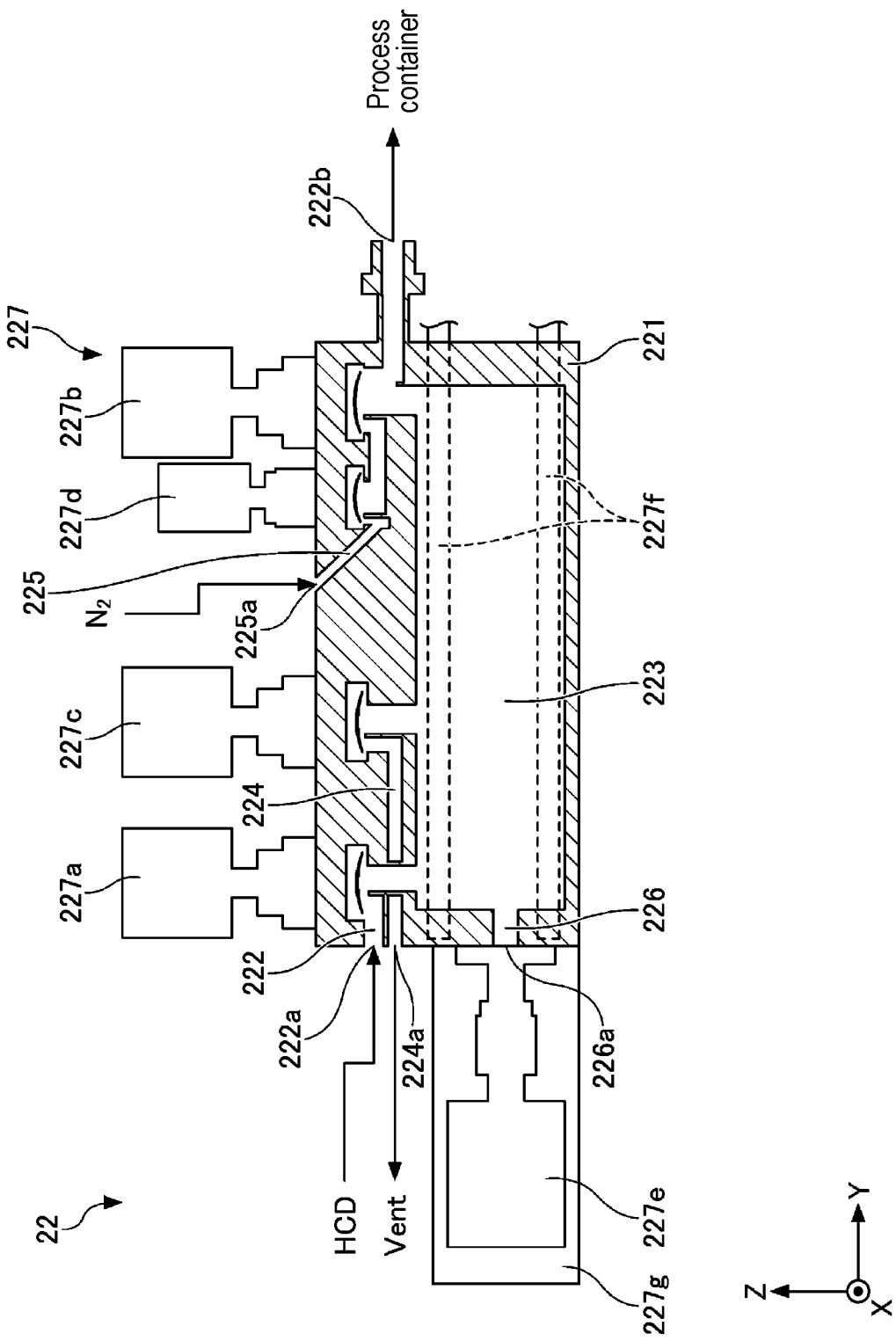
FIG. 2 is a cross-sectional view illustrating a fluid control device according to the embodiment.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, non-limiting exemplary embodiments of the present disclosure will be described with reference to the accompanying drawings. In all the accompanying drawings, the same or corresponding members or components will be denoted by the same or corresponding reference numerals, and redundant descriptions thereof will be omitted.

[Substrate Processing Apparatus]

A substrate processing apparatus according to an embodiment will be described with reference to FIG. 1. The substrate processing apparatus according to the embodiment is an apparatus configured to accommodate substrates inside a process container and to perform predetermined processes (e.g., film formation and etching) on the substrates. The substrate processing apparatus is, for example, a batch type apparatus that processes a plurality of substrates at once. The substrate processing apparatus may be a single wafer type apparatus that processes one substrate at a time.

The substrate processing apparatus includes a process container 1, a gas supplier 2, and an exhauster 3. In the substrate processing apparatus, a predetermined process is performed on a substrate accommodated inside the process container 1 by supplying a process gas into the process container 1 by the gas supplier 2. In the substrate processing apparatus, the process gas supplied into the process container 1 is discharged through the exhauster 3.

The process container 1 accommodates the substrate. The process container 1 has a supply port 11, and the process gas is supplied into the process container 1 from the gas supplier 2 via the supply port 11. The process container 1 has an exhaust port 12, and the process gas is discharged from inside the process container 1 via the exhaust port 12.

The gas supplier 2 includes a supply source 21, a fluid control device 22, and a supply pipe 23. The supply source 21 includes a process gas supply source 21a and a purge gas supply source 21b. The process gas supply source 21a may include a vaporizer. The process gas is, for example, a hexachlorodisilane (HCD) gas. The process gas may be a dichlorosilane (DCS) gas. A purge gas is, for example, a nitrogen ($N_2$) gas. The purge gas may be an argon (Ar) gas. The supply source 21 may include a supply source for a reaction gas such as oxygen-containing gas and nitrogen-containing gas. The fluid control device 22 controls a fluid supplied into the process container 1. Details of the fluid control device 22 will be described later. The supply pipe 23 connects the supply source 21 to the supply port 11. In the gas supplier 2, the process gas introduced from the supply source 21 is controlled in flow rate by the fluid control device 22 and is then supplied into the process container 1 via the supply port 11.

The exhauster 3 includes an exhaust pipe 31, an APC valve 32, and a vacuum pump 33. The exhaust pipe 31 connects the exhaust port 12 to the vacuum pump 33. The APC valve 32 is interposed in the exhaust pipe 31. The APC valve 32 adjusts the exhaust speed by controlling the conductance of the exhaust pipe 31. The vacuum pump 33 exhausts the interior of the process container 1 via the exhaust pipe 31. Examples of the vacuum pump 33 include a dry pump and a turbo molecular pump.

[Fluid Control Device]

The fluid control device 22 included in the substrate processing apparatus according to the embodiment will be described with reference to FIGS. 1 to 4.

The fluid control device 22 includes a flow path block 221. The flow path block 221 is formed in a substantially block shape. The flow path block 221 is made of, for example, a metal material such as stainless steel. The flow path block 221 includes a process gas supply flow path 222, a storage chamber 223, an exhaust flow path 224, a purge gas supply flow path 225, and a measurement flow path 226. However, the flow path block 221 may not include the exhaust flow path 224, the purge gas supply flow path 225, and the measurement flow path 226.

The process gas supply flow path 222 has an inlet 222a and an outlet 222b. The inlet 222a is a port through which the process gas is introduced from the process gas supply source 21a. The inlet 222a is provided on a front surface (negative side in a Y-axis direction) of the flow path block 221. The outlet 222b is a port through which the process gas introduced from the inlet 222a flows into the process container 1. The outlet 222b is provided on a rear surface (positive side in the Y-axis direction) of the flow path block 221.

The storage chamber 223 is provided inside the flow path block 221. The storage chamber 223 is positioned at the process gas supply flow path 222 between the inlet 222a and the outlet 222b. The storage chamber 223 stores the process gas flowing through the process gas supply flow path 222. The storage chamber 223 has a volume larger than the process gas supply flow path 222.

The exhaust flow path 224 is connected to the storage chamber 223. The exhaust flow path 224 discharges the process gas from inside the storage chamber 223. The exhaust flow path 224 has an exhaust port 224a. The exhaust port 224a is used to discharge the process gas from inside the storage chamber 223. The exhaust port 224a is provided on the front surface (negative side in the Y-axis direction) of the flow path block 221. In other words, the exhaust port 224a is provided on the same surface as the inlet 222a. However, as illustrated in FIG. 3, the exhaust port 224a may be provided on the upper surface (positive side in a Z-axis direction) of the flow path block 221.

The purge gas supply flow path 225 is connected to the process gas supply flow path 222 between the storage chamber 223 and the outlet 222b. The purge gas supply flow path 225 supplies the purge gas to the process gas supply flow path 222. The purge gas supply flow path 225 has an inlet 225a. The inlet 225a is a port through which the purge gas is introduced from the purge gas supply source 21b. The inlet 225a is provided on the upper surface (positive side in the Z-axis direction) of the flow path block 221. However, the inlet 225a may be provided on the front surface (negative side in the Y-axis direction) of the flow path block 221.

The measurement flow path 226 is connected to the storage chamber 223. The measurement flow path 226 has a measurement port 226a. The measurement port 226a is provided on the same surface as the inlet 222a of the flow path block 221. However, as illustrated in FIG. 4, the measurement port 226a may be provided on the same surface as the outlet 222b of the flow path block 221.

The fluid control device 22 includes a fluid controller 227. The fluid controller 227 includes valves 227a, 227b, 227c, and 227d, a pressure sensor 227e, and heaters 227f and 227g.

The valve 227a opens and closes the process gas supply flow path 222 between the inlet 222a and the storage chamber 223. When the valve 227a is opened, the process gas is introduced into the storage chamber 223. When the valve 227a is closed, the introduction of the process gas into the storage chamber 223 is stopped. The valve 227a is an example of a first valve.

The valve 227b opens and closes the process gas supply flow path 222 between the storage chamber 223 and the outlet 222b. When the valve 227b is opened, the process gas is supplied into the process container 1 from the storage chamber 223. When the valve 227b is closed, the supply of the process gas from the storage chamber 223 into the process container 1 is stopped. The valve 227b switches the connection state between the process gas supply flow path 222 and the purge gas supply flow path 225. The valve 227b is, for example, a three-way valve. The valve 227b is an example of a second valve.

The valve 227c opens and closes the exhaust flow path 224. When the valve 227c is opened, the process gas is discharged from inside the storage chamber 223. When the valve 227c is closed, the discharge of the process gas from inside the storage chamber 223 is stopped. The valve 227c is an example of a third valve.

The valve 227d opens and closes the purge gas supply flow path 225. When the valve 227d is opened, the purge gas is introduced into the process gas supply flow path 222. When the valve 227d is closed, the introduction of the purge gas into the process gas supply flow path 222 is stopped.

Each of the valves 227a, 227b, 227c, and 227d is, for example, a diaphragm valve. The valve 227a, the valve 227c, the valve 227d, and the valve 227b are arranged in a row in this order from the front surface (negative side in the Y-axis direction) to the rear surface (positive side in the Y-axis direction) of the flow path block 221. This may shorten the dimension of the fluid control device 22 in the width direction (an X-axis direction). Therefore, it becomes easier to arrange a plurality of fluid control devices 22 side by side in the width direction (the X-axis direction). In other words, expandability is improved.

The pressure sensor 227e detects the internal pressure of the storage chamber 223. The pressure sensor 227e is provided on the front surface (negative side in the Y-axis direction) of the flow path block 221. The pressure sensor 227e is provided on the surface of the flow path block 221 where the inlet 222a is provided. However, as illustrated in FIG. 4, the pressure sensor 227e may be provided on the rear surface (positive side in the Y-axis direction) of the flow path block 221. In addition, in FIG. 4, the illustration of the heater 227f is omitted.

The heater 227f is provided in the interior of the flow path block 221. The heater 227f has a rod shape that is inserted through the interior of the flow path block 221 from the rear surface (positive side in the Y-axis direction) of the flow path block 221 and extends along the Y-axis direction to a vicinity of the front surface (negative side in the Y-axis direction) of the flow path block 221. However, the heater 227f may be inserted through the interior of the flow path block 221 from the front surface of the flow path block 221. The heater 227f heats the process gas flowing through the process gas supply flow path 222 and the process gas stored inside the storage chamber 223. In this case, the number of heaters 227f may be reduced, compared to the case where the storage chamber 223 that stores the process gas is provided separately from the fluid control device 22. This results in easier temperature management since there are fewer temperature management points. Therefore, temperature variations may be reduced. Further, power consumption may be reduced. The heater 227f is, for example, a cartridge heater.

The heater 227g is installed to the pressure sensor 227e. The heater 227g covers the pressure sensor 227e. The heater 227g heats the pressure sensor 227e. The heater 227g is, for example, a jacket heater.

In this fluid control device 22, the process gas may be stored inside the storage chamber 223 by closing the valves 227b, 227c, and 227d and opening the valve 227a. In this fluid control device 22, when the valves 227a, 227c, and 227d are closed and the valve 227b is opened while the process gas is stored inside the storage chamber 223, the process gas stored inside the storage chamber 223 may be supplied into the process container 1 within a short time.

As described above, the fluid control device 22 according to the embodiment includes the flow path block 221 and the fluid controller 227 installed to the flow path block 221. The flow path block 221 includes the process gas supply flow path 222 and the storage chamber 223. The process gas supply flow path 222 has the inlet 222a, through which the process gas is introduced, and the outlet 222b through which the process gas flows into the process container 1. The storage chamber 223 stores the process gas in the process gas supply flow path 222 between the inlet 222a and the outlet 222b. The fluid controller 227 includes the valve 227a that opens and closes the process gas supply flow path 222 between the inlet 222a and the storage chamber 223 and the valve 227b that opens and closes the process gas supply flow path 222 between the storage chamber 223 and the outlet 222b. In this case, a distance between the storage chamber 223 and the valve 227b is short, resulting in a lower pressure loss in the process gas supply flow path 222 between the storage chamber 223 and the valve 227b. Therefore, a large flow rate of process gas may be supplied into the process container 1 within a short time. For example, when forming a silicon nitride film on a substrate having a large surface area, such as for a memory, by atomic layer deposition, the fluid control device 22 according to the embodiment may supply a large flow rate of process gas into the process container 1 within a short time, achieving good in-plane uniformity and step coverage.

Further, in the fluid control device 22 according to the embodiment, the process gas supply flow path 222 and the storage chamber 223 are provided inside a single flow path block 221. This structure allows for the formation of the flow path block 221 by cutting. Therefore, it is possible to reduce dimensional variations between a plurality of fluid control devices 22.

Further, the storage chamber 223 and the fluid controller 227 are configured as a single component in the fluid control device 22 according to the embodiment, which may result in a reduction in the number of components. This leads to improved maintainability.

The embodiments disclosed herein should be considered to be exemplary and not limitative in all respects. The above embodiments may be omitted, replaced, or changed in various forms without departing from the scope of the appended claims and their spirit.

According to the present disclosure, it is possible to supply a large flow rate of process gas within a short time.

While certain embodiments have been described, these embodiments have been presented by way of example only, and are not intended to limit the scope of the disclosures.

Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A fluid control device that controls a fluid supplied into a process container, the fluid control device comprising:
   a flow path block; and
   a fluid controller installed to the flow path block,
   wherein the flow path block includes:
      a gas supply flow path including an inlet, through which the fluid is introduced, and an outlet through which the fluid flows into the process container; and
      a storage chamber that stores the fluid in the gas supply flow path between the inlet and the outlet, and
   wherein the fluid controller includes:
      a first valve that opens and closes the gas supply flow path between the inlet and the storage chamber; and
      a second valve that opens and closes the gas supply flow path between the storage chamber and the outlet,
   wherein the storage chamber has a volume larger than a volume of the gas supply flow path,
   wherein the flow path block includes an exhaust flow path connected to the storage chamber, and
   wherein the fluid controller includes a third valve that opens and closes the exhaust flow path.

2. The fluid control device of claim 1, wherein the first valve, the third valve, and the second valve are arranged in a row in this order from the inlet to the outlet.

3. The fluid control device of claim 2, wherein the exhaust flow path has an exhaust port provided on a surface of the flow path block where the inlet is provided.

4. The fluid control device of claim 1, wherein the exhaust flow path has an exhaust port provided on a surface of the flow path block where the inlet is provided.

5. The fluid control device of claim 1, wherein the fluid controller includes a pressure sensor that detects an internal pressure of the storage chamber.

6. The fluid control device of claim 5, wherein the pressure sensor is provided on a surface of the flow path block where the inlet is provided.

7. The fluid control device of claim 1, wherein the fluid controller includes a heater provided in an interior of the flow path block.

8. A substrate processing apparatus comprising:
   a process container; and
   a fluid control device that controls a fluid supplied into the process container,
   wherein the fluid control device includes:
      a flow path block; and
      a fluid controller installed to the flow path block,
   wherein the flow path block includes:
      a gas supply flow path including an inlet, through which the fluid is introduced, and an outlet through which the fluid flows into the process container; and
      a storage chamber that stores the fluid in the gas supply flow path between the inlet and the outlet, and
   wherein the fluid controller includes:
      a first valve that opens and closes the gas supply flow path between the inlet and the storage chamber; and
      a second valve that opens and closes the gas supply flow path between the storage chamber and the outlet wherein the storage chamber has a volume larger than a volume of the gas supply flow path, wherein the flow path block includes an exhaust flow path connected to the storage chamber, and wherein the fluid controller includes a third valve that opens and closes the exhaust flow path.

* * * * *